(No Model.)
C. W. WEDDELL & J. K. WATERS.
CONVERTIBLE VEHICLE AND ROCKER.
No. 606,494. Patented June 28, 1898.
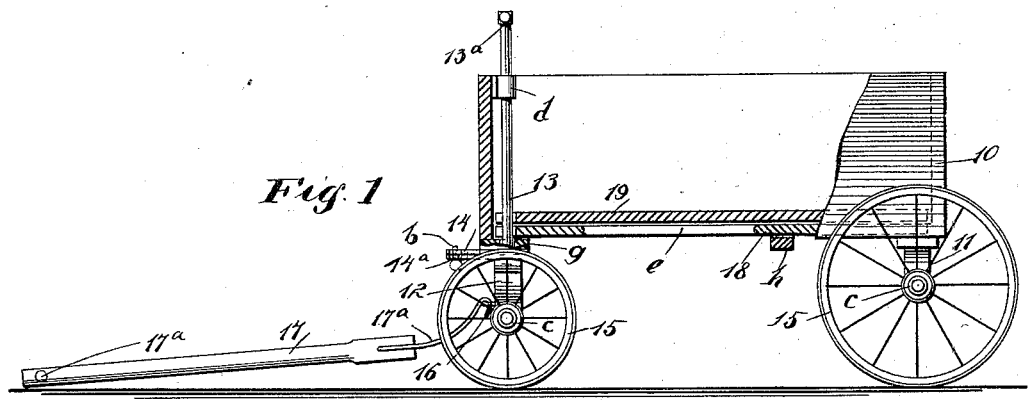
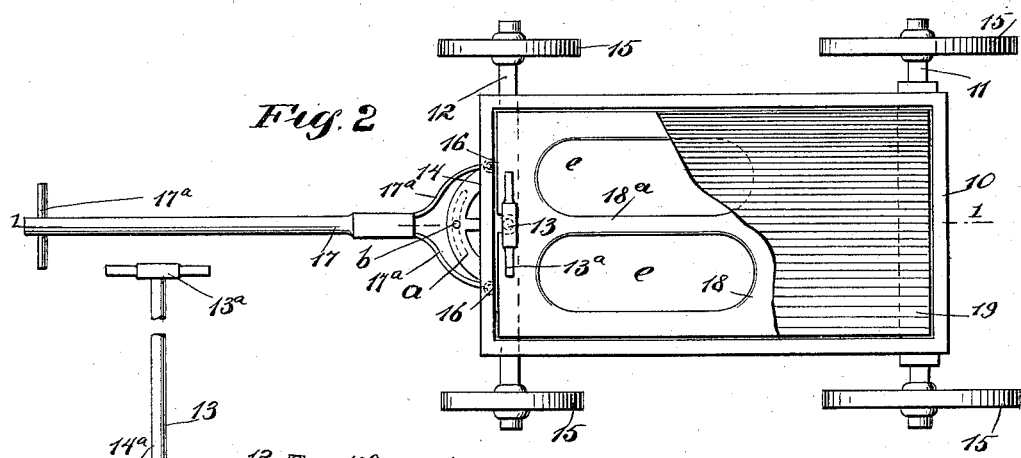
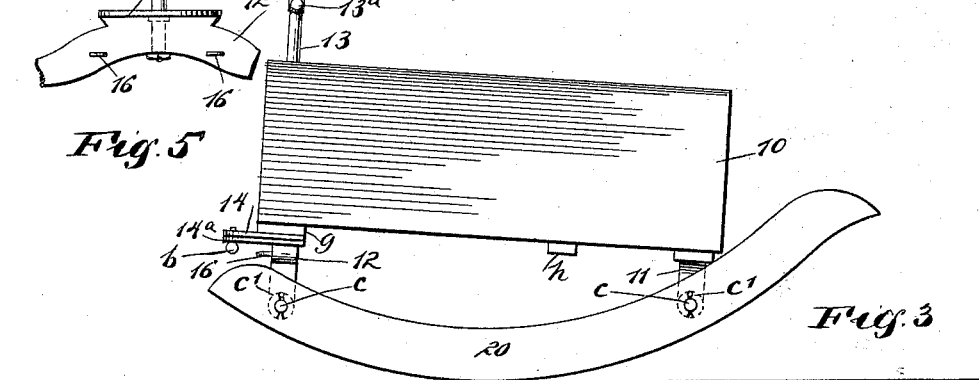
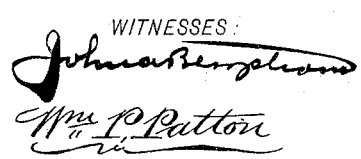
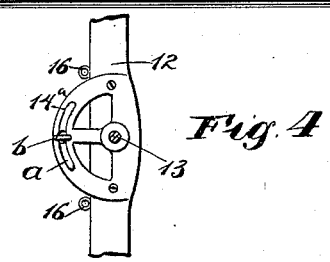

UNITED STATES PATENT OFFICE.

CHARLES W. WEDDELL AND JAMES K. WATERS, OF THURMONT, MARYLAND.

CONVERTIBLE VEHICLE AND ROCKER.

SPECIFICATION forming part of Letters Patent No. 606,494, dated June 28, 1898.

Application filed September 13, 1897. Serial No. 651,550. (No model.)

*To all whom it may concern:*

Be it known that we, CHARLES W. WEDDELL and JAMES K. WATERS, of Thurmont, in the county of Frederick and State of Maryland, have invented a new and Improved Convertible Vehicle and Rocker, of which the following is a full, clear, and exact description.

This invention relates to a novel device designed for the use of small children, and has for its object to provide a child's wagon with novel features of construction, which adapt said vehicle for quick and convenient conversion into a child's perambulator or into a rocking-chair, as may be desired.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side view of the vehicle adapted for use as a wagon, the section being substantially on the line 1 1 in Fig. 2. Fig. 2 is a plan view of the vehicle, showing a removable bottom of the wagon-body broken away to expose an apertured bottom beneath it. Fig. 3 is a side view showing the vehicle-body provided with rockers. Fig. 4 is a reverse plan view in part of the front axle and a curved wear-plate thereon forming a part of the invention, and Fig. 5 is a front elevation in part of the front axle and novel attachments thereto.

The body 10, forming the main portion of the convertible vehicle, is essentially rectangular in form and may be constructed of any suitable material and be finished in any desired style. Near the rear end of the body 10 an axle 11 is transversely secured and projects a proper distance at each side of said body.

At the front end of the body 10 and on its lower side another axle 12 is pivoted, so as to be adapted to swing, and the ends of said axle are projected at each side of the body, like those of the rear axle 11. The front axle 12 is preferably secured to the lower end of the upright post 13, that is affixed at the longitudinal center of the axle. An essentially semicircular wear-plate 14 is attached to the front of the body 10 on the lower side thereof, and a mating wear-plate $14^a$ is affixed upon the upper side of the front axle 12 at the longitudinal center thereof, and the post 13 passes through both said wear-plates. The lower wear-plate $14^a$ has a curved slot $a$ formed therein near its front edge, as shown in Figs. 2 and 4, and through said slot $a$ bolt $b$ projects upwardly, having a threaded engagement with a tapped perforation in the upper wear-plate 14, said bolt having a thumb-piece on the lower end, whereby the bolt may be manipulated to clamp the wear-plates 14 $14^a$ together.

Spindles $c$ are formed on the ends of the front and rear axles for the reception of the wagon-wheels 15, that are loosely mounted on the spindles, and are held from displacement by the keeper-pins $c'$ or by other suitable means.

Near the upper edge of the front wall of the body 10 a journal-box $d$ is secured, through which the post 13 is loosely projected a sufficient height above the body to adapt said post for effective service.

On the upper end of the post 13 a cross-handle bar $13^a$ is affixed and affords convenient means for a rotatable movement of the post, and if the bolt $b$ is slackened the post will swing the front axle 12 in either direction, as may be desired, and it will be seen that the swing of said axle is limited by the length of the slot $a$ in the wear-plate $14^a$.

On the front axle 12 ring-like projections 16 are secured, and equally spaced from the ends of the axle two limbs $17^a$, forming the rear portions of the pull-bar 17, are loosely secured, so as to permit a rocking movement of the pull-bar in a vertical plane. From the disposition of the pull-bar 17 on the front axle 12 it will be seen that a lateral movement of said pull-bar will correspondingly actuate the front axle.

In service when the wear-plates 14 $14^a$ are held in loose contact by slackening the bolt $b$ it will be evident that the front axle 12 may be swung so as to permit the wheels thereon to nearly contact with, but not pass below, the body 10, which in case the device is used as a wagon may be necessary to allow the vehicle to be turned in a small circle by the use of the pull-bar 17 as a means for drawing the wagon and guiding it.

The body 10 is furnished with two bottoms 18 19, that when in position lie one upon the other. The lowermost bottom 18 has two elongated openings $e$ formed in the forward portion by the removal of the material composing the bottom, thereby producing a longitudinally-central bar 18$^a$ at the forward portion of the bottom 18. The main portion of the bottom 18, which is essentially rectangular, loosely fits in the lower portion of the body 10 and is seated upon the rear axle 11, a further support therefor being afforded by the front transverse bolster-cleat $g$ and the intermediate transverse cleat $h$, which are affixed across the under side of the body 10, as shown in Fig. 1.

On the apertured bottom 18 the other rectangular-shaped bottom 19 is imposed, this latter bottom, that is loosely fitted into the body 10, being designed to afford a lower wall for said body when the vehicle is to be used as a wagon.

It will be seen that when a child is placed in the body 10, wherein the upper bottom 19 has been introduced, the child may grip the handle-bar 13$^a$, and thus the child may hold its body upright while seated on the board 19, the vehicle then being propelled as a wagon by the pull-bar 17 and cross-handle 17$^a$ thereon.

If the device is to be converted into a perambulator, the upper bottom 19 is removed, thus exposing the apertured bottom 18, and the child who is to be supported while learning to walk is placed in the body 10 and its lower limbs are inserted through the elongated holes $e$ at each side of the center bar 18$^a$. If the occupant of the perambulator is to be left to guide the device personally, then the pull-bar 17 may have its looped portion unhooked from the projections 16, and the screw $b$ is tightened so as to clamp the wear-plates 14 14$^a$ together. The child can now walk without danger of toppling over at either side, as the front wheels of the vehicle cannot go beneath the body 10, the front axle being held from swinging by the clamped wear-plates.

The clamped condition of the wear-plates 14 14$^a$, that prevent the front axle from turning on its central post or pivot 13, is a great aid to the infant learning to walk, as the child may receive support from the cross bar or handle 13$^a$ on the post 13 while walking, but cannot turn the post or the vehicle from a straight forward direction.

The wheels 15 may be readily removed from the spindles $c$ to receive the rockers 20, which are removably secured on said spindles by the cross-keys $c'$, as shown in Fig. 3. When said rockers are secured in place for service, they serve to convert the wheeled vehicle into a rocking device for the use of children.

Having thus described our invention, we claim as new and desire to secure by Letters Patent—

1. The combination with a body, a fixed rear axle, and a fixed cleat or bolster-block at the front of the body, of a front axle, wheels on both of said axles, a pivot-post secured on the front axle and loosely passing up through the bolster or cleat, a cross-handle on the top of the post, a wear-plate on the bolster, and a wear-plate on the front axle, and means for clamping the wear-plates together to prevent said axle from swinging, as specified.

2. The combination with a vehicle-body, a fixed rear axle and a pivoted front axle, and wheels on both of said axles, of means for controlling the swinging movement of the front axle by the occupant of the body, a removable bottom for the body, a bottom located below the removable bottom and having two spaced elongated apertures near its forward end, a wear-plate on the body adapted to receive the threaded body of a screw-bolt, and a wear-plate secured on the front axle and in loose contact with the upper wear-plate, and having a curved slot through which the screw-bolt passes, the slot having a length adapting the two wear-plates to be slidable one on the other and to limit the swinging movement of the front axle, as specified.

3. The combination with a vehicle-body, and a front and a rear axle, of rockers removably held on the axle-spindles, as specified.

CHARLES W. WEDDELL.
JAMES K. WATERS.

Witnesses:
  E. B. SEPTOR,
  MARTIN L. WEDDLE.